(12) United States Patent
Namboodiri et al.

(10) Patent No.: US 9,613,417 B2
(45) Date of Patent: Apr. 4, 2017

(54) CALIBRATION OF PLENOPTIC IMAGING SYSTEMS USING FOURIER TRANSFORM

(71) Applicants: Vipin Namboodiri, Bangalore (IN); Krishna Prasad Agara Venkatesha Rao, Bangalore (IN)

(72) Inventors: Vipin Namboodiri, Bangalore (IN); Krishna Prasad Agara Venkatesha Rao, Bangalore (IN)

(73) Assignee: Ricoh Company, Ltd., Tokyo (JP)

( * ) Notice: Subject to any disclaimer, the term of this patent is extended or adjusted under 35 U.S.C. 154(b) by 88 days.

(21) Appl. No.: 14/638,907

(22) Filed: Mar. 4, 2015

(65) Prior Publication Data

US 2016/0260205 A1 Sep. 8, 2016

(51) Int. Cl.
*G06K 9/32* (2006.01)
*G06T 7/00* (2017.01)
*H04N 13/02* (2006.01)
*G01J 1/42* (2006.01)

(52) U.S. Cl.
CPC ............ *G06T 7/002* (2013.01); *G06T 7/0018* (2013.01); *H04N 13/0246* (2013.01); *H04N 13/0296* (2013.01); *G06T 2207/10052* (2013.01); *G06T 2207/20056* (2013.01)

(58) Field of Classification Search
CPC .............. H04N 13/00; G06T 7/00; A61B 1/00
USPC .................. 382/140, 212, 294, 321; 356/228
See application file for complete search history.

(56) References Cited

U.S. PATENT DOCUMENTS

| | | | |
|---|---|---|---|
| 6,987,805 B1 * | 1/2006 | Weckel | H04N 19/176 348/699 |
| 8,244,058 B1 * | 8/2012 | Intwala | G06T 5/10 382/275 |
| 9,153,026 B2 * | 10/2015 | Meng | H04N 17/002 |
| 2013/0127901 A1 | 5/2013 | Georgiev et al. | |
| 2014/0239071 A1 | 8/2014 | Hennick et al. | |
| 2015/0187047 A1 * | 7/2015 | Lumsdaine | H04N 5/23229 382/280 |

FOREIGN PATENT DOCUMENTS

EP 2736262 A2 5/2014

OTHER PUBLICATIONS

European Extended Search Report, European Application No. 16155951.3, Jul. 20, 2016, 8 pages.
Wetzstein, G. et al., "Computational Plenoptic Imaging," Computer Graphics Forum, Dec. 2011, pp. 2397-2426, vol. 30, No. 6.

* cited by examiner

*Primary Examiner* — Abolfazl Tabatabai
(74) *Attorney, Agent, or Firm* — Fenwick & West LLP

(57) ABSTRACT

Calibration for a plenoptic imaging system. The plenoptic imaging system includes a detector array that is subdivided into superpixels. A plenoptic image captured by the detector array of the plenoptic imaging system is accessed. For a row of superpixels, a slice is selected through the row, the selected slice having a Fourier transform with a stronger fundamental component compared to other slices through the row. A pitch of the row of superpixels is determined based on a frequency of the fundamental component of the selected slice. A rotation of the row of superpixels is determined based on a rotation of the selected slice.

20 Claims, 15 Drawing Sheets

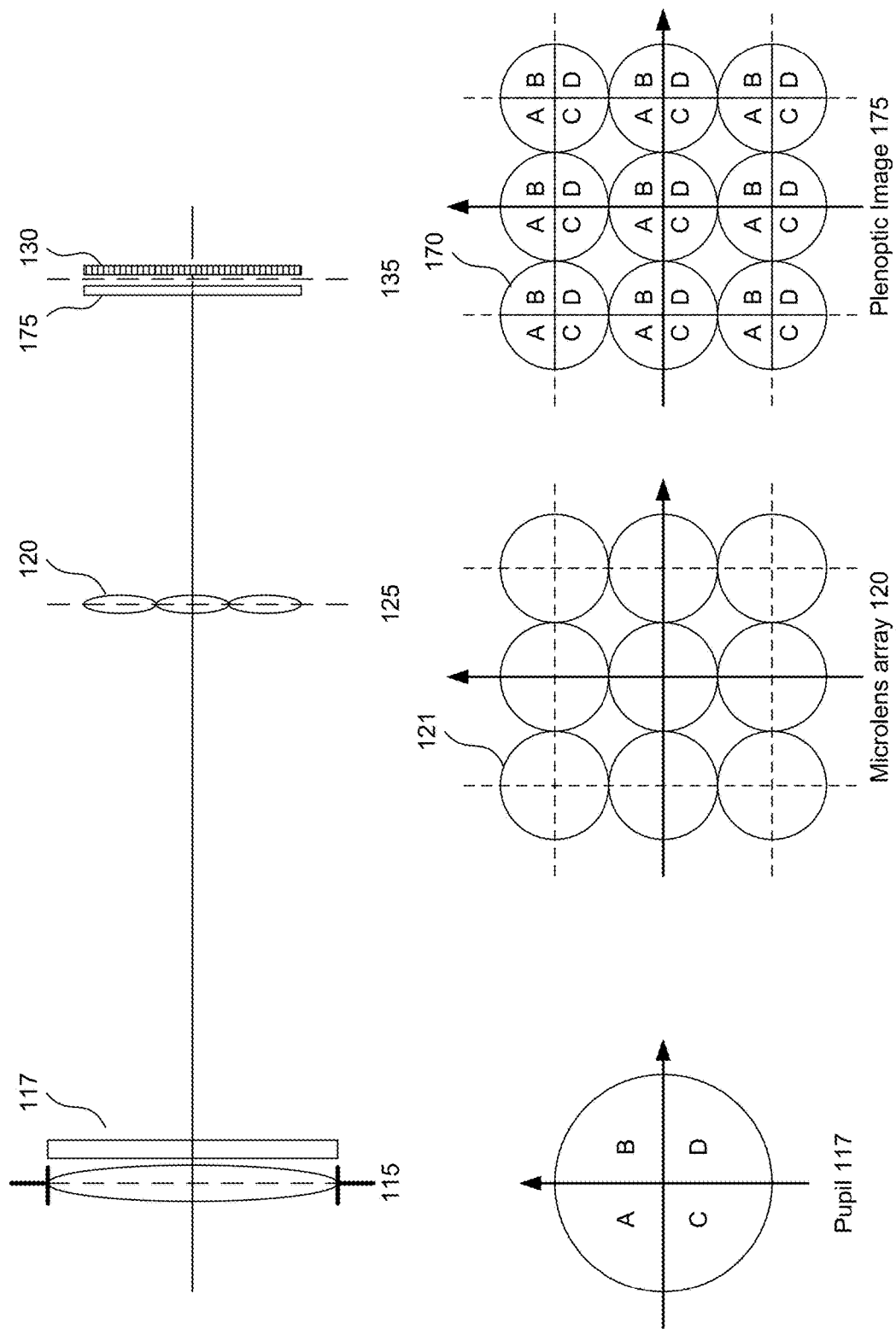

CALIBRATION OF PLENOPTIC IMAGING SYSTEMS USING FOURIER TRANSFORM

BACKGROUND

1. Field of the Disclosure

This disclosure relates generally to plenoptic imaging systems and, more particularly, to the calibration of plenoptic imaging systems.

2. Description of the Related Art

The plenoptic imaging system has recently received increased attention. It can be used to recalculate a different focus point or point of view of an object, based on digital processing of the captured plenoptic image. The plenoptic imaging system also finds application in multi-modal imaging, using a multi-modal filter array in the pupil plane of the primary imaging module. Each filter is imaged at the sensor, effectively producing a multiplexed image of the object for each imaging modality of the filter array. Other applications for plenoptic imaging systems include varying depth of field imaging and high dynamic range imaging.

However, the architecture of a plenoptic imaging system is different from that of a conventional imaging system, and therefore requires different calibration and processing procedures. Several challenges are found in the processing of plenoptic images. First, the alignment of the microlens array is never perfect and the effect of rotation of the microlens array relative to the sensor array is quite observable. This rotation introduces a large amount of difficulties for image reconstruction because the data points do not fall onto a regular sampling grid. Additionally, for different applications, different focus settings may be used. For plenoptic imaging systems, a change in focus affects the angle of the incident light which can impact the effective pitch of the image towards its periphery, by a small but cognizable amount.

Thus, there is a need for calibration techniques for plenoptic imaging systems.

SUMMARY

Certain embodiments overcome the limitations of the prior art by providing a method for calibrating a plenoptic imaging system. The plenoptic imaging system includes a detector array that is subdivided into superpixels. A plenoptic image captured by the detector array of the plenoptic imaging system is accessed. For a row of superpixels, a slice is selected through the row, the selected slice having a Fourier transform with a stronger fundamental component compared to other slices through the row. A pitch of the row of superpixels is determined based on a frequency of the fundamental component of the selected slice. A rotation of the row of superpixels is determined based on a rotation of the plenoptic image relative to the selected slice.

Other aspects of the disclosure include computer-readable storage mediums and systems corresponding to the methods described above, and applications for the foregoing.

BRIEF DESCRIPTION OF THE DRAWINGS

Embodiments in the disclosure have other advantages and features which will be more readily apparent from the following detailed description and the appended claims, when taken in conjunction with the accompanying drawings, in which:

FIG. 2A is a diagram illustrating plenoptic imaging with perfectly aligned components, according to an embodiment.

Figure 1A:
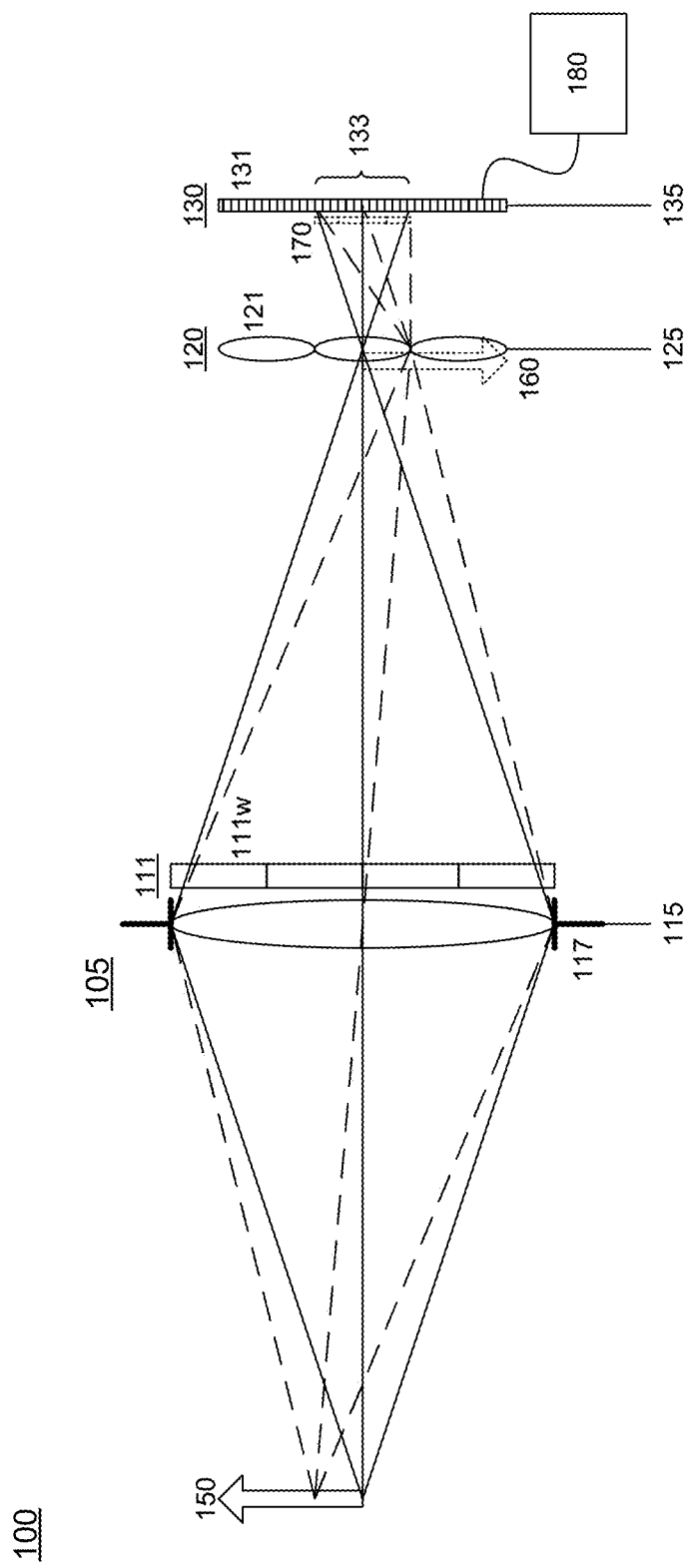
FIG. 1A is a diagram of a plenoptic imaging system, according to an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

FIGS. 1A-1D are diagrams of a plenoptic imaging system 100 according to an embodiment. The plenoptic imaging system 100 captures a plenoptic image of an object 150. The plenoptic imaging system 100 includes an image-forming optical module 105, which in FIG. 1 is represented by a single lens element although it is understood that the optical module 105 could contain multiple elements and/or non-lens elements (e.g., mirrors). The optical module 105 forms a conventional optical image 160 of object 150. The optical module 105 may also be referred to as the primary imaging module, subsystem or system. The optical image 160 is formed at an image plane 125 of the optical module 105. The optical module 105 is characterized by a pupil 117 and pupil plane 115, which in FIG. 1 is represented by a physical aperture stop co-located with the single lens element. In more complex optical modules 105, the pupil 117 and pupil plane 115 need not be co-located with any of the optical elements within the optical module.

In a conventional imaging system, a detector array would be located at image plane 125 to capture the optical image 160. However, this is not the case for the plenoptic imaging system 100 in FIG. 1. For purposes of illustration, the pupil 117 may be divided into different regions 111w-z (only region 111w is labeled in FIG. 1A) to help illustrate the concepts discussed below with regard to FIGS. 1B-1D.

Second, a micro-imaging array 120 of micro-imaging elements 121 is located at the image plane 125. In FIG. 1, the micro-imaging elements 121 are shown as microlenses. Other elements can also be used, for example, an array of pinholes. The detector array 130 is located behind (i.e., optically downstream of) the micro-imaging array 120. More specifically, the detector array 130 is positioned in a conjugate plane 135 to the pupil plane 115. That is, each micro-imaging element 121 creates an image of the pupil plane 115 at the conjugate plane 135, which image is captured by the detector array 130.

In the case of microlenses, each microlens 121 forms an image 170 of the pupil at the detector plane 135. The image of the pupil is captured by a subset of detectors 131 in the detector array 130. Each microlens 121 forms its own image 170. Thus, the overall plenoptic image formed at detector plane 135 will include an array of superpixels 170, one for each microlens 121. This arrayed imaging effectively subdivides the detector array into superpixels 133, each of which contains multiple detectors 131. Each microlens 121 images the pupil onto the corresponding superpixel 133, with each pupil image then captured by detectors in the corresponding superpixel.

Figure 1B:
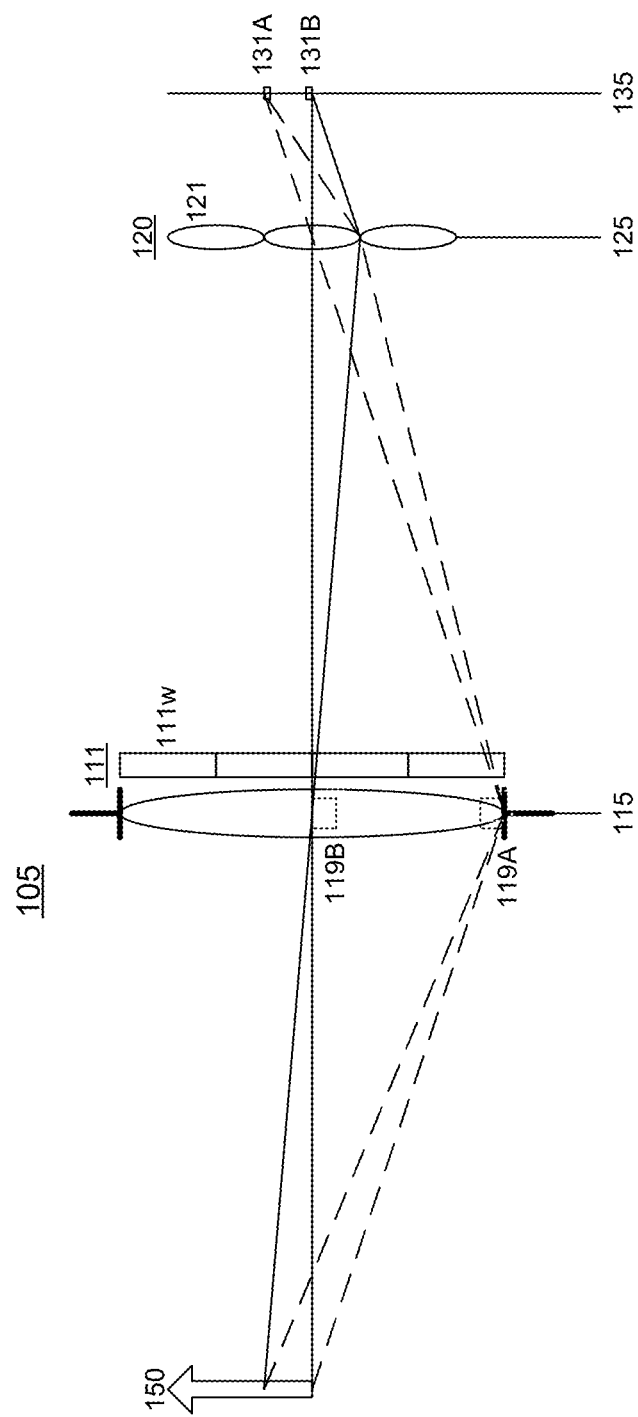
FIG. 1B illustrates the projection of a detector onto the pupil plane, according to an embodiment.

Conversely, referring to FIG. 1B, each individual detector 131 can be projected through a microlens 121 to a corresponding location 119 in the pupil plane 115. For that specific detector 131, the microlens 121 collects light from the corresponding location 119. FIG. 1B shows the projection of detector 131A through the center microlens to location 119A, and the projection of detector 131B to location 119B. The projection 119 of the detector preferably is magnified by at least 10× relative to the actual detector size 131.

Figure 1C:
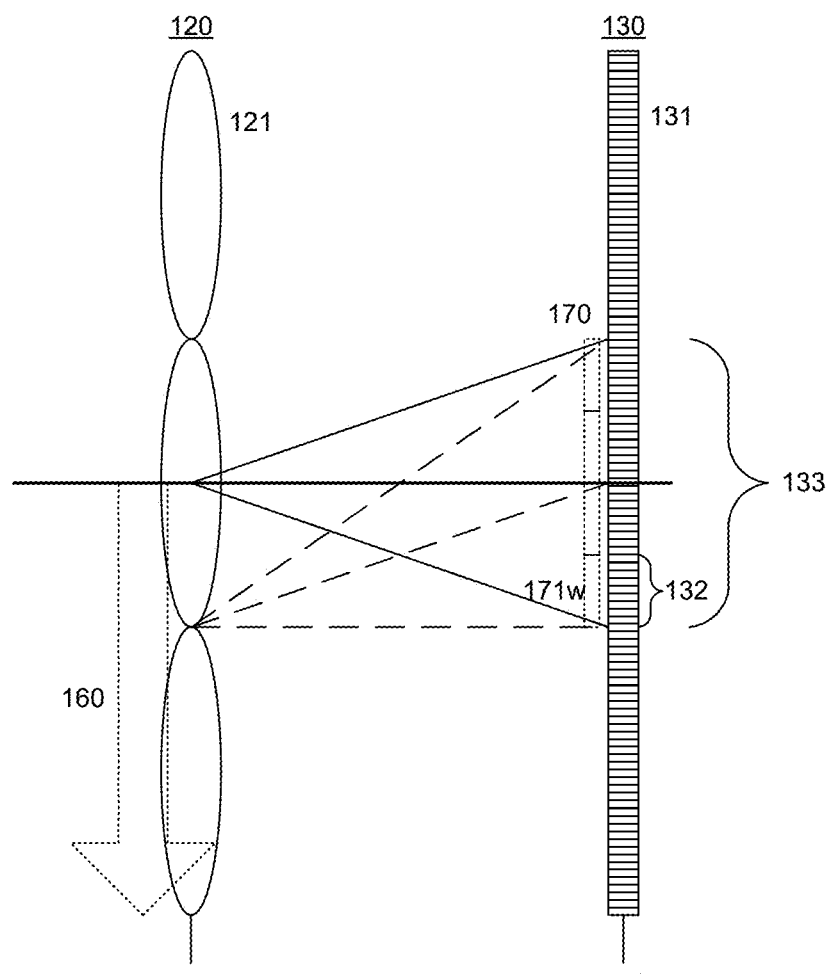
FIG. 1C is a detail of FIG. 1A, according to an embodiment.

Referring to FIG. 1C for more detail, each microlens 121 images the regions 111w-z (that falls within the pupil) onto a superpixel 133. Each individual region 111w is only a portion of the totality of regions 111, so the image 171w of a region 111w will cover only a portion of the superpixel 133. That portion will be referred to as a subpixel 132, as shown in the detail of FIG. 1C. That is, each microlens 121 directs light from a region 111 to a corresponding subpixel 132. Each subpixel 132 may contain one or more detectors.

Each detector 131 collects light from one region (e.g., region 111w) that travels through one microlens 121. The micro-imaging array 120 is located in a conjugate plane to the object 150, so there is also an imaging relationship between the object 150 and the micro-imaging array 120. Therefore, the light incident on a microlens is light originating from a portion of the object, not from the entire object. In some systems, a filter array is located at the pupil plane and each region 111 corresponds to a different filter. In that case, each detector 131 collects the light from a corresponding portion of the object (as determined by the extent of the microlens), as filtered by the corresponding filter 111.

Figure 1D:
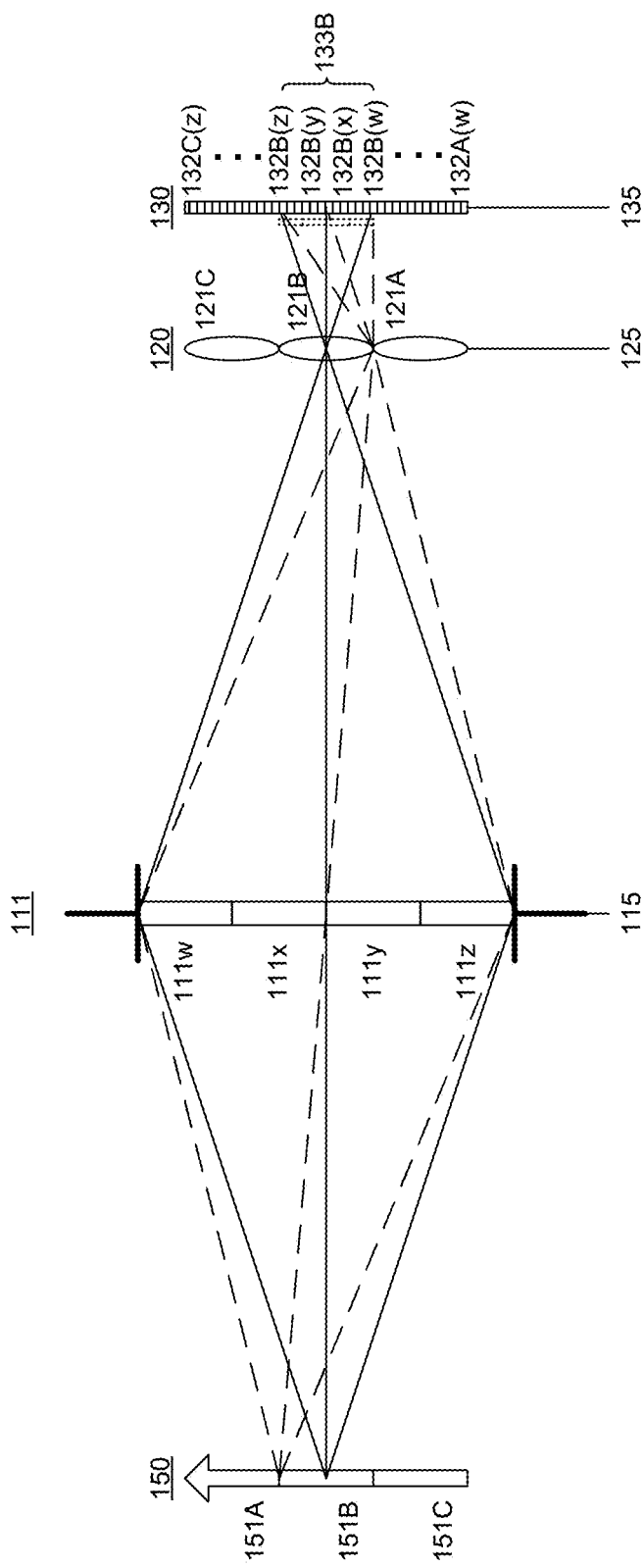
FIG. 1D is a diagram further illustrating the operation of the system of FIG. 1A, according to an embodiment.

FIG. 1D illustrates this concept in more detail. For clarity, the main lens 105 is omitted. In this example, the object 150 is divided into three subobjects 151A,B,C. Similarly, the four regions 111w,x,y,z correspond to four different filters. The object 150 is imaged onto the micro-imaging array 120. More specifically, the subobject 151B is imaged onto microlens 121B. This means that every ray that leaves subobject 151B will travel through the pupil (and through different regions 111, depending on where in the pupil) and arrive at microlens 121B. Similarly, subobject 151A is imaged onto microlens 121A, and subobject 151C is imaged onto microlens 121C.

In addition, microlens 121B will image all of the regions 111 (at least the portion that falls within the pupil) onto subarray 133B. Thus, region 111w will be imaged by microlens 121B onto subpixel 132B(w), region 111x onto subpixel 132B(x), and so on for the other filter/subpixel pairs, and for the other microlenses 121. For detectors 131 that fall entirely within subpixel 132B(w), those detectors will detect light coming from subobject 151B passing through region 111w. The same is true for the other subpixels 132A(w)-132C(z).

The imaging system is a "lightfield" imaging system because the rays collected by a detector are a function of not only their position in the object plane (as is the case in conventional imaging systems), but also a function of their position in the pupil plane.

Referring again to FIG. 1A, a processing module 180 collects the data from the detector array 130 and processes it accordingly. As a simple example, the digital processing unit 180 may reorder the data, collecting together the data from subpixels 132A(w), 132B(w) and 132C(w) in order to form an image of the entire object for light passing through region (or filter) 111w. The same can be done for regions 111x,y,z. Other types of processing can also be performed, since the captured lightfield includes information with respect to both the pupil plane and the object.

Manufacturing of the plenoptic imaging system 100 does not always result in the micro-imaging array 120 being well aligned to the detector array 130. Processing of the plenoptic image is sensitive to misalignments between the micro-imaging array 120 and detector array 130. In the previous example, in order to process subpixels 132A(w), 132B(w) and 132C(w), it should be known which individual detectors correspond to subpixels 132A(w), 132B(w) and 132C(w). A misalignment can affect view extraction within the plenoptic imaging system 110.

FIG. 2A is a diagram illustrating plenoptic imaging when the pupil 117 and the micro-imaging array 120 are perfectly aligned with the detector array 130. In this example, the pupil 117 is circular and divided into four regions A-D, for example a circular lens used in conjunction with a four-quadrant filter array. The micro-imaging array 120 is a 3×3 array of microlenses 121. The micro-imaging array 120 is defined by the center of each microlens, in addition to the clear aperture for each microlens. The microlenses are perfectly aligned so that their centers lie on a square grid, as shown by the dashed lines. The resulting plenoptic image 175 is a 3×3 array of superpixels 170 of the pupil (i.e., superpixels). Magnification and inversion are ignored for clarity. The center of each image 170 lies on a square grid determined by the square grid defining the centers of the microlenses. The thick x and y axes in FIG. 2A show the local coordinate systems as defined relative to the detector array. For the plenoptic image 175, the thick x and y axes show the position of the plenoptic image 175 relative to the detector array. The alignment of the plenoptic image 175 with the detector array 130 determines which detectors correspond to which superpixels and subpixels. In FIG. 2A, the plenoptic image 175 is perfectly aligned with the detector array.

Figure 2B:
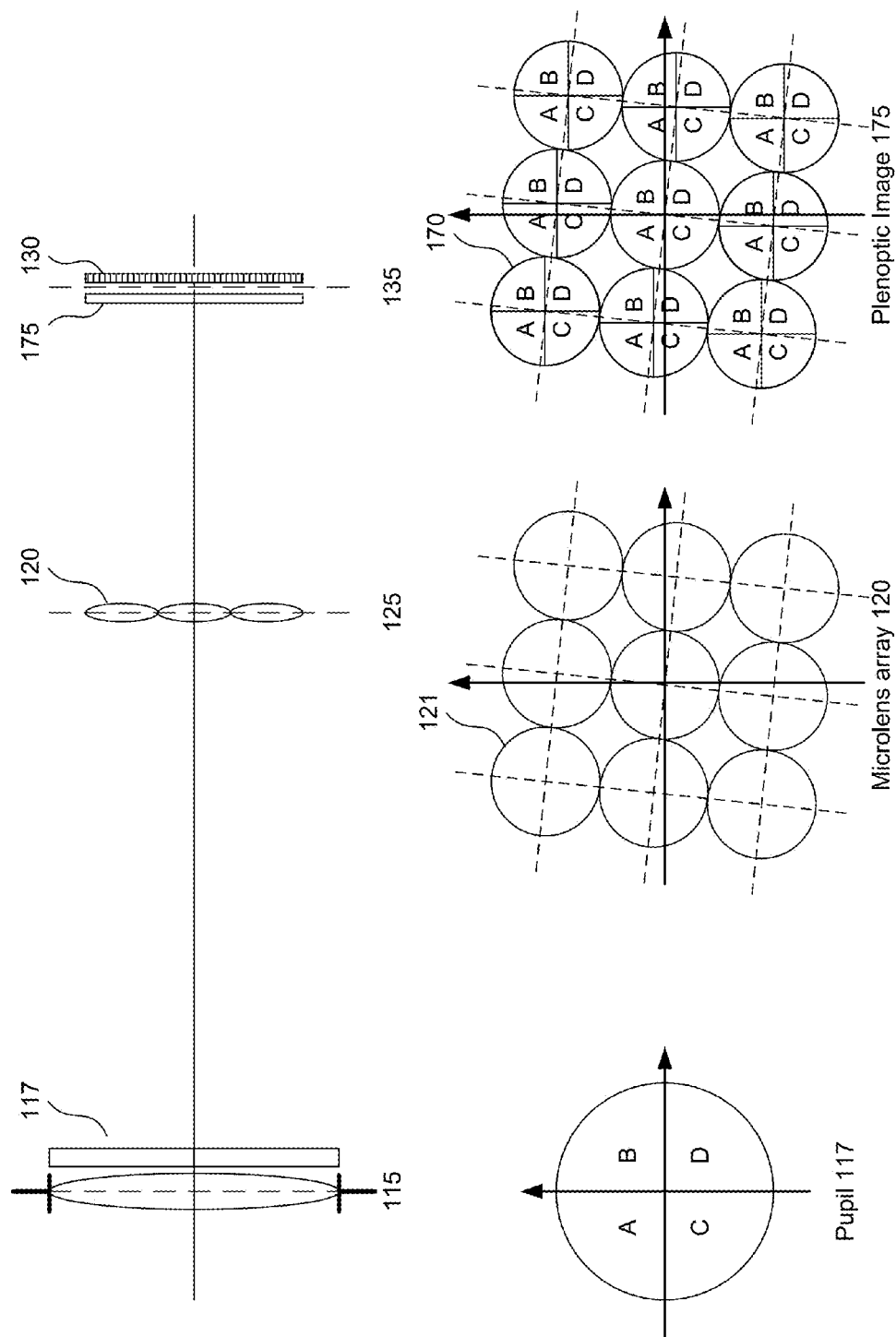
FIG. 2B is a diagram illustrating the effect of a misaligned micro-imaging array, according to an embodiment.

FIG. 2B is a diagram illustrating the effect of a misaligned micro-imaging array 120. In this figure, the thick x and y axes show the original aligned positions of the components. In FIG. 2B, the micro-imaging array 120 is rotated. This rotates the square grid that defines the location of each image 170 in the plenoptic image. However, each image 170 is not itself rotated (assuming that the microlenses themselves are rotationally symmetric). That is, each image 170 is translated to a new location due to the rotation of the underlying square grid. The rotation may be due to, e.g., a misalignment of the microlenses 121 during manufacturing. Whatever the cause, the rotation affects the perfect square grid of FIG. 2A. The new centers of the microlenses define a new grid.

Note that the misalignment in FIG. 2B changes which detectors contribute to which superpixels and subpixels. For clarity, magnification was ignored in FIGS. 2A and 2B. However, changes in magnification of the plenoptic image 175 (i.e., stretching or shrinking of the dashed square grid) will also change which detectors contribute to which superpixels and subpixels. In general, it is important to accurately map the detector array to the plenoptic image so that the plenoptic image can be processed with good results. In many situations, this mapping is preferably done through a calibration process.

As further explained below, calibration typically includes determining a rotation of the plenoptic image relative to the detector array 130. Determining the rotation is important, because if it is not accounted for errors in view extraction occur. Calibration also mainly includes determining a pitch (i.e., size) of the superpixels relative to the detector array 130. In some embodiments, the imaging plenoptic system 100 performs super resolution techniques on the extracted views. Accordingly, it is important to have accurate pitch as it affects the super resolution techniques. Rotation and pitch can be affected by positioning of the microlens array 120 relative to the detector array 130, but can also be affected by other factors, for example a change in focus setting. Also, since super resolution techniques are to be applied, it is imperative for the pitch to have a high granularity in terms of subpixel. Hence it becomes very important to find the exact pitch and represent it in non-integer pixel terms.

Figure 3:
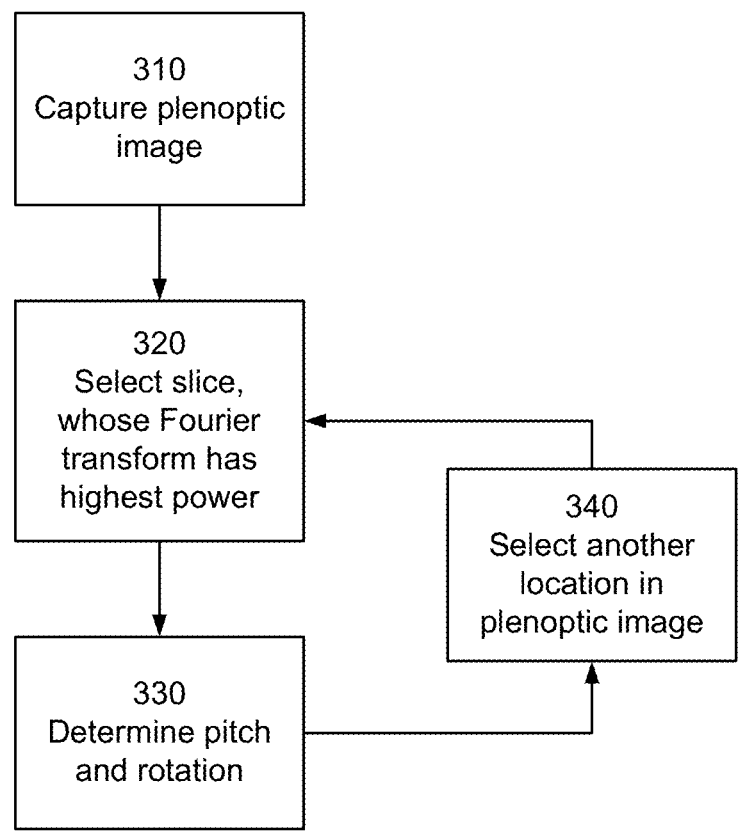
FIG. 3 is a flow diagram of one method for calibrating a plenoptic imaging system, according to an embodiment.

FIG. 3 is a flow diagram of one method for calibrating a plenoptic imaging system 100. In one embodiment, the process of FIG. 3 is performed by the plenoptic imaging system 100 (e.g., via the processing module 180). Other modules may perform some or all of the steps of the process in other embodiments. Likewise, embodiments may include different and/or additional steps, or perform the steps in different orders.

The plenoptic imaging system 100 captures 310 a reference plenoptic image. In some embodiments, the plenoptic imaging system images an object (e.g., a white card that when imaged fills the detector array 130) that is uniformly illuminated to create the reference plenoptic image. As discussed above, each microlens 121 forms an image or superpixel 170 of the pupil 117 at the detector plane 135. Accordingly, a reference plenoptic image generated in the manner described above is a two-dimensional array of images or superpixels, one for each microlens 121.

Different one-dimensional slices can be taken through the reference two-dimensional plenoptic image. For calibration purposes, we are primarily concerned with one-dimensional slices that are taken through a row of superpixels. For example, consider a row of N superpixels. Slices can be taken through the top, middle or bottom of the row of superpixels, i.e., at different offset within the row which has the highest spectral power. Slices can also be taken at different rotations of the image. For example, one slice could extend from bottom left to top right of the row, another could extend through the middle of the row, and yet another could extend from top left to bottom right of the row. In some embodiments, the offset within the row is fixed.

The calibration procedure selects 320 a one-dimensional slice through the reference plenoptic image which Fourier transform (e.g., discrete Fourier transform) has the highest spectral power in the reference plenoptic image. "Highest" power typically is implemented as the slice with the higher spectral power in its fundamental component. In one approach, this is achieved by first considering slices at different offsets within a row of superpixels. The slices are parallel to each other and span the row of superpixels. See FIGS. 5A and 5B. The slice with the highest spectral power (e.g., a stronger fundamental component compared to other slices) is selected. The reference plenoptic image is then rotated to different angles relative to the selected slice to produce a second plurality of slices. See FIGS. 7A to 7E. Physically, a slice is a row of raw sensor data which has been upscaled based on the precision requirement for the pitch (e.g., 8×, 16× upscale). Again, the slice with the highest spectral power is selected.

The selected slice is used to determine 330 the pitch and rotation of that portion of the plenoptic image relative to the detector array 130. The pitch is determined based on a fundamental frequency of the Fourier transform of the selected slice. For example, pitch may be determined by dividing a fundamental frequency associated with the highest spectral power by a size of the sample. In some embodiments, the size of the sample takes into account spectral leakage.

The rotation is determined based on the rotation of the selected slice. The rest of the plenoptic image may be assumed to have the same pitch and rotation. Alternately (and optionally), the process may be repeated 340 for different locations in the plenoptic image (i.e., different rows of superpixels) to determine the pitch and rotation for each location. For example, where the slice is for a row that spans the entire plenoptic image, it may be assumed that the pitch and rotation are constant across the entire row. Alternatively, there may be multiple slices used to span the entire plenoptic image. In that case, a different pitch and rotation may be determined for each of the multiple slices (i.e., a piecewise solution). Interpolation can also be used when there are multiple sample points. Pitch may also be determined for different directions. The pitch in x and y are different due to hexagonal packing but the other pitch can be determined using simple geometry.

In step 320, different methodologies may be used to identify the slice with the highest spectral power. Methodologies may include, for example, an iterative method (e.g., as discussed below with respect to rotation in FIG. 4), an exhaustive search, a gradient ascent, some other methodology that identifies a maximum value within a set of numbers, or some combination thereof. In addition, given a row of superpixels, identifying a slice typically uses two or more variables: offset of the slice, rotation of the slice, possibly length of the slice. These variables can be optimized separately or together. For example, FIG. 4 first selects offset and then rotation. In an alternate approach, both of these variables may be optimized together.

Figure 4:
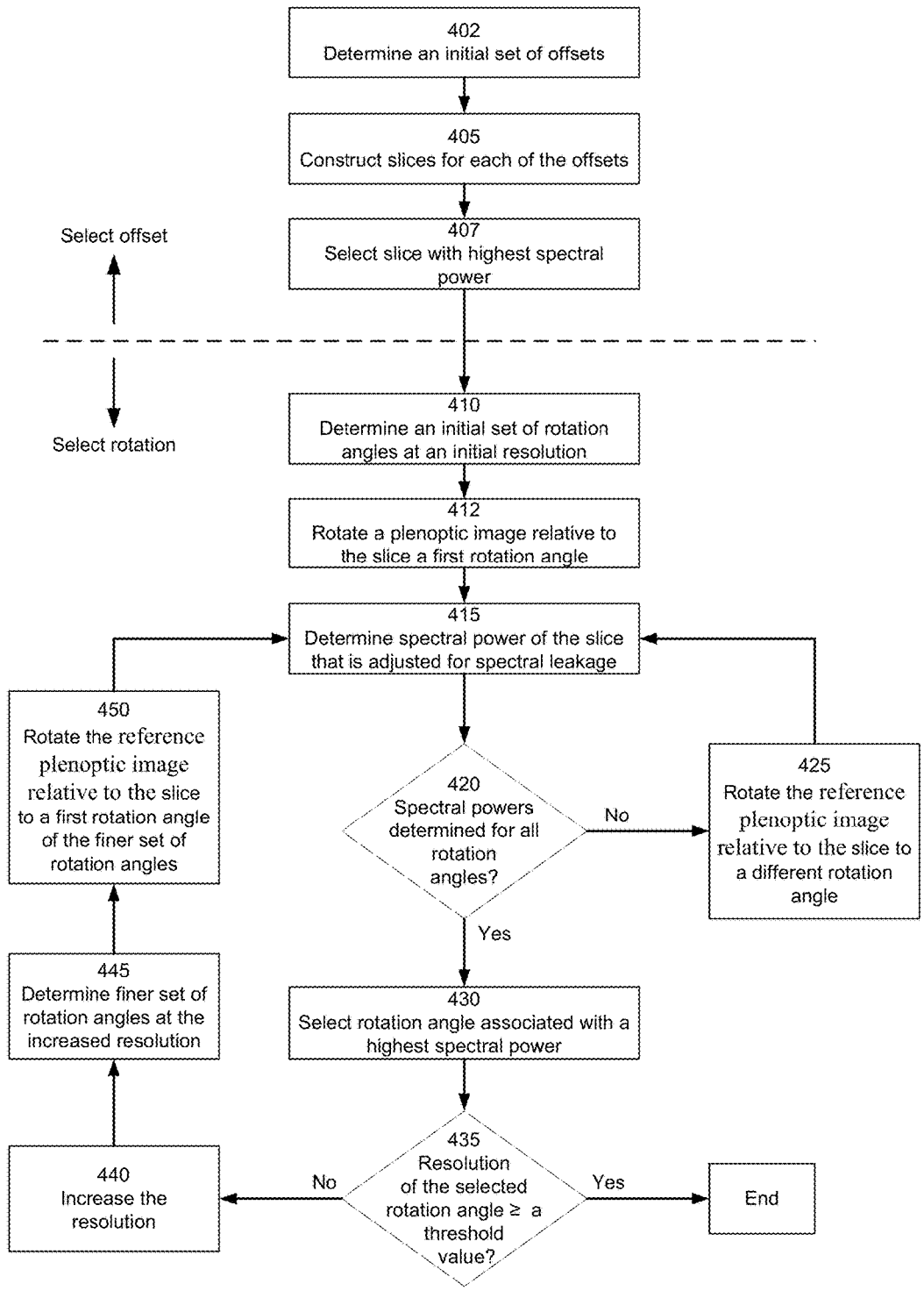
FIG. 4 is a flow diagram of a method for selecting a slice as discussed in FIG. 3, according to an embodiment.

FIG. 4 is a flow diagram of an embodiment for selecting 320 a slice, as discussed in FIG. 3. In one embodiment, the process of FIG. 4 is performed by the plenoptic imaging system 100 (e.g., via the processing module 180). Other modules may perform some or all of the steps of the process in other embodiments. Likewise, embodiments may include different and/or additional steps, or perform the steps in different orders. Note that the data values for data provided in FIG. 4 (and also later in FIGS. 6A-D, 7A-E, and 8A-B) are just examples, and that the data values are for a particular main lens (e.g., optical module 105) and camera sensor (e.g., detector array 130). If some other main lens with a different focal value and/or other camera sensor is used the data values may differ.

The process shown in FIG. 4 can be divided into two phases. The first phase includes steps lower than 410. This phase considers slices at different offsets within a row of superpixels. The slices are parallel to each other and span the row of superpixels. The one-dimensional slices are first defined 402 and then constructed 405. The slice with the highest spectral power (e.g., a stronger fundamental component compared to other slices) is selected 407.

The second phase includes steps 410 and higher. In this phase, the reference plenoptic image is rotated to different angles relative to the slice selected in the first phase and the best rotation angle is selected. An initial set of rotation angles at an initial resolution is determined 410. In some embodiments, the initial set of rotation angles bracket zero radians and are at the initial resolution. The initial resolution controls the separation between adjacent rotation angles. For example, an initial resolution may be 0.001 radians, and the set of rotations angles may be [−0.010, −0.009, . . . 0.000 . . . 0.009, 0.010]. In this example, the size of the bracket is 21 rotation angles. In other embodiments, the size of the bracket and/or the initial resolution may be larger or smaller.

The reference plenoptic image is rotated 412 relative to the slice to a first rotation angle. As the reference plenoptic image is rotated relative to the slice, the slice samples different portions of the plenoptic reference image. Accordingly, each rotation angle corresponds to a slice sampling a different portion of the plenoptic reference image.

The spectral power of the slice is determined 415 and adjusted for spectral leakage. This is done by taking a Discrete Fourier Transform (DFT) of the slice, and determining the spectral power of the slice using the output of the DFT.

Note, because the slice is finite, the DFT of the slice results in a slight smearing of the output in the frequency spectrum. Spectral leakage is essentially unwanted frequency components that are introduced into the output of the DFT because the slice is finite in length. The frequency components generally manifest as sudden frequency jumps or some other high frequency phenomena which can mask the desired frequency components.

Spectral leakage is adjusted by performing a spectral hunt—as illustrated below with regard to FIGS. 6A-6D. To perform a spectral hunt, a spectral power (e.g., using a DFT of the slice) of the slice is determined for different sized samples of the slice, to ensure that the correct frequency components (e.g., those corresponding to pitch of the microlenses) are given a chance to resonate and are not being overshadowed by spectral leakage. In some embodiments, a start point corresponding to the start of the slice and an end point corresponding to an end of the slice are determined. A spectral power for the slice inclusive of the start point and end point is determined. The start point is shifted by one pixel towards the end point, in effect dropping the previous start point from the slice, and the spectral power for the now slightly smaller slice is determined. This process of shifting the start point and determining a spectral power of the increasingly truncated slice is repeated until a threshold number of pixels have been dropped. Accordingly, a plurality of spectrum power are generated that each correspond to different sizes of the slice. In some embodiments, the threshold number of pixels are such that the dropped portion of the slice spans two adjacent superpixels. A spectral power, of the plurality of spectral powers, that has the highest spectral power of frequency components is selected, which correspond to the pitch of the plenoptic image.

Returning to FIG. 4, step 420 determines whether spectral powers have been determined for all the rotation angles in the initial set of rotation angles. If not, the reference plenoptic image is rotated 425 relative to the slice to a different rotation angle. Continuing with the example above, the plenoptic image may be rotated such that it is at −0.009 radians relative to the slice selected in the first phase. The process flow then moves to step 415 and determines a spectral power of the slice at the different rotation angle. The process continues such that spectral powers are determined for the slice at all the rotation angles in the set of rotation angles. Note, that in this embodiment, the determined spectral powers all have been adjusted for spectral leakage. In alternate embodiments, the calibration module does not adjust the spectral power of spectral leakage.

A rotation angle that is associated with a highest spectral power is selected 430. For example, the rotation angle with the highest spectral power, of the initial set of rotation angles, may be −0.006 radians, which would then be selected (see Table 1 below). Step 435 determines whether the resolution of the selected rotation angle is greater than or equal to a threshold value. The threshold value determines how precisely the angle of rotation is determined. For example, a threshold value might be 0.00001 radians. If the resolution of the selected rotation angle is greater than or equal to the threshold value, the process ends. Otherwise, if the resolution of the selected rotation angle is less than the threshold value, the resolution is increased 440, for example by a factor of 10. Continuing with the example, above, the resolution would now be 0.0001 radians instead of 0.001 radians.

Step 445 determines a finer set of rotation angles at the increased resolution. The finer set of rotation angles bracket the previously selected rotation angle (selected at step 430). Continuing with the example above, the calibration module would bracket −0.006 radians (i.e., the previously selected rotation angle) by rotation angles at the increased resolution of 0.0001 radians. For example, the finer set of rotations angles may be [−0.0070, −0.0069, . . . −0.0060 . . . , −0.0051, −0.0050].

The reference plenoptic image is rotated 450 relative to the slice to a first rotation angle of the finer set of rotation angles. For example, the plenoptic image may be rotated such that it is at −0.0070 radians relative to the slice selected in the first phase. The process flow then moves to step 415, and via steps 415, 420, 425, 430, and 435 determines spectral powers for the slice at each rotation angle of the finer set of rotation angles and selects 430 a rotation angle of the finer set of rotation angles with the highest adjusted power. For example, of the finer set of rotation angles, a rotation angle of −0.0063 radians may have the highest adjusted spectral power. Again step 435 determines whether the resolution of the selected rotation angle is greater than or equal to a threshold value, and if the resolution of the selected rotation angle is still less than the threshold value, the process flow would move to step 440. In this manner, the calibration process is able to rapidly identify a rotation angle to very fine degree in an iterative manner.

Once the calibration process determines 435 that the resolution of the selected rotation angle is greater than or equal to the threshold value, the process ends and moves to step 330 of FIG. 3.

For example, Table 1 illustrates the results of steps 410-450 to select a rotation angle with the highest spectral power for a particular reference image for a particular main lens (e.g., optical module 105) and camera sensor (e.g., detector array 130). If a main lens with other focal values and/or other camera sensors are used the values may differ.

Figure 5A:
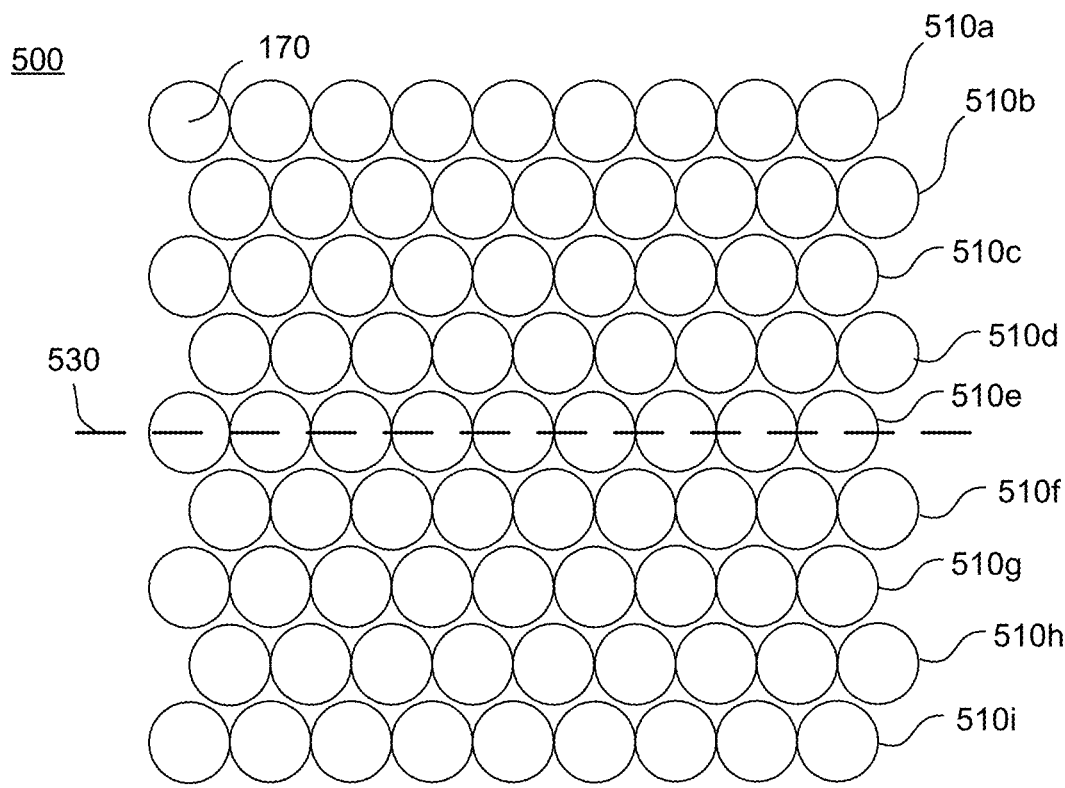
FIG. 5A is a diagram illustrating an example reference plenoptic image, according to an embodiment.

500 in FIG. 5A. The spectral power of a slice varies with its offset within a row. The reference plenoptic image 500 is a mostly periodic array of superpixels 170 of the pupil 117. The offset of a slice through a row 510 of superpixels 170 affects the spectral power associated with the slice. For example, the row 510 may include a slice 540a through a top portion of the row 510, a slice 540b through the middle of the row 510, and a slice 540c through a bottom portion of the row 510. The spectral power of the slices 540a, 540b, and 540c are all different from each other, and for the row 510 there is one slice that has a higher spectral power than other slices within the row 510. For example, the slice 540b may have the highest spectral power. Note that in some embodiments, slices may span the row 510 or a portion thereof at a non-zero angle relative to the row (e.g., if a slice is rotated relative to the row 510).

FIGS. 6A-D illustrate different steps in the spectral hunt discussed above with reference to FIG. 4. As pixels are dropped a spectral component 640 may increase and/or decrease in power. The maximum spectral power for the spectral component 640 occurs at the fundamental frequency

TABLE 1

| Radian angles | Power | Winner | Radian angles | Power | Winner | Radian angles | Power | Winner |
|---|---|---|---|---|---|---|---|---|
| −0.01 | 0.553558 | −0.006 | −0.007 | 0.974218 | −0.0063 | −0.0064 | 0.996944 | −0.00626 |
| −0.009 | 0.544362 | | −0.0069 | 0.981303 | | −0.00639 | 0.999123 | |
| −0.008 | 0.660915 | | −0.0068 | 0.986633 | | −0.00638 | 0.999146 | |
| −0.007 | 0.974218 | | −0.0067 | 0.990593 | | −0.00637 | 0.999167 | |
| −0.006 | 0.999 | | −0.0066 | 0.993448 | | −0.00636 | 0.999186 | |
| −0.005 | 0.988111 | | −0.0065 | 0.995505 | | −0.00635 | 0.999196 | |
| −0.004 | 0.879552 | | −0.0064 | 0.996944 | | −0.00634 | 0.999207 | |
| −0.003 | 0.888948 | | −0.0063 | 0.999 | | −0.00633 | 0.999219 | |
| −0.002 | 0.811748 | | −0.0062 | 0.999237 | | −0.00632 | 0.999227 | |
| −0.001 | 0.758556 | | −0.0061 | 0.999167 | | −0.00631 | 0.999242 | |
| 0 | 0.810296 | | −0.006 | 0.999218 | | −0.0063 | 0.999248 | |
| 0.001 | 0.697728 | | −0.0059 | 0.999112 | | −0.00629 | 0.999259 | |
| 0.002 | 0.664195 | | −0.0058 | 0.99904 | | −0.00628 | 0.999258 | |
| 0.003 | 0.618561 | | −0.0057 | 0.999025 | | −0.00627 | 0.999261 | |
| 0.004 | 0.624458 | | −0.0056 | 0.998881 | | −0.00626 | 0.999 | |
| 0.005 | 0.638484 | | −0.0055 | 0.996598 | | −0.00625 | 0.99926 | |
| 0.006 | 0.616264 | | −0.0054 | 0.995454 | | −0.00624 | 0.999264 | |
| 0.007 | 0.60689 | | −0.0053 | 0.993947 | | −0.00623 | 0.999256 | |
| 0.008 | 0.635314 | | −0.0052 | 0.992237 | | −0.00622 | 0.999252 | |
| 0.009 | 0.655319 | | −0.0051 | 0.990205 | | −0.00621 | 0.999243 | |
| 0.01 | 0.603927 | | −0.005 | 0.988111 | | −0.0062 | 0.999237 | |

It is apparent from the example values in Table 1, that the calibration process started with a resolution of 0.001 radians, and determined an initial winner (i.e., has the highest spectral power of the given set of rotation angles) at a rotation angle of −0.006 radians. It then increased the resolution by a factor of 10, and then found another winning rotation angle at the finer resolution (i.e., −0.0063 radians). It then increased the resolution by a factor of 10, and found a final winner at −0.00626 radians.

Figure 5B:
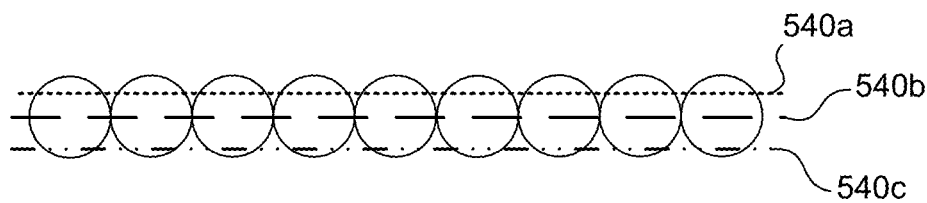
FIG. 5B is a diagram illustrating slice offset using a row of images from the reference plenoptic image in FIG. 5A, according to an embodiment.

FIGS. 5A and 5B illustrate the first phase of FIG. 4. FIG. 5A is a diagram illustrating an example reference plenoptic image 500. In this example, the micro imaging array 120 is a 9×9 array of hexagonally-packed microlenses 121. Accordingly, the reference plenoptic image 500 includes a 9×9 array of hexagonally-packed superpixels 170. The 9×9 array is comprised of 9 rows 510a-i that each includes nine superpixels for each of the corresponding microlenses in the micro-imaging array 120. The first phase of FIG. 4 finds a slice 530 of the reference plenoptic image 500 whose Fourier transform has the highest spectral power in the reference plenoptic image.

Figure 6A:
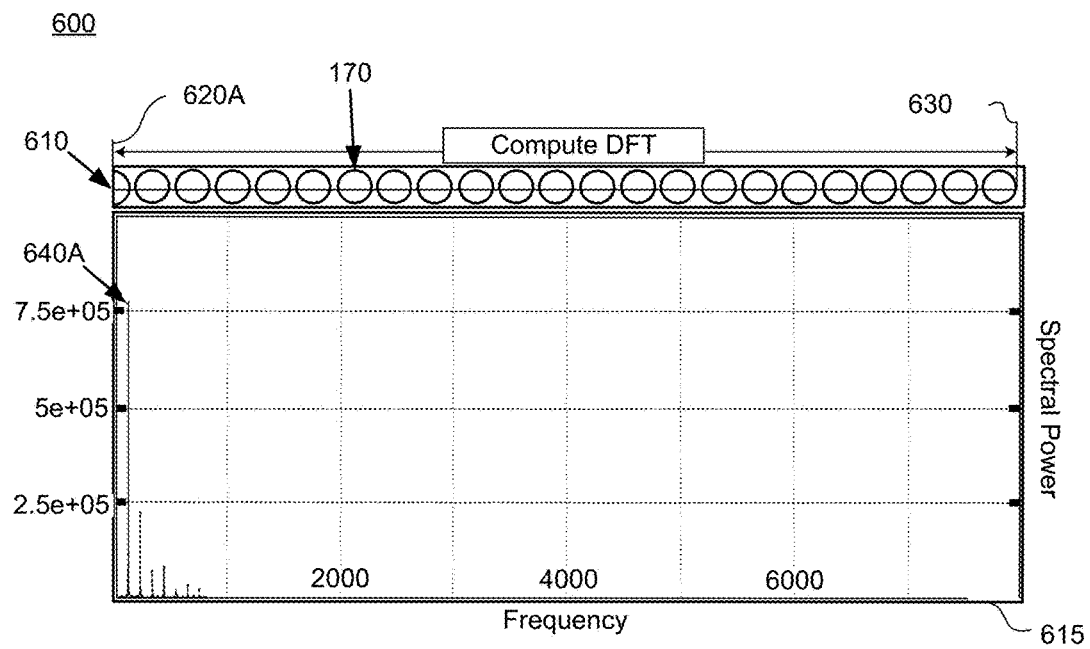
FIG. 6A is a diagram illustrating a spectral power of a slice calculated for a rotation angle of −0.006 radians with zero pixels dropped, according to an embodiment.

FIG. 5B is a diagram illustrating slice offset using a row 510 of superpixels 170 from the reference plenoptic image which is used to calculate pitch as described above with respect to FIGS. 3 and 4. FIG. 6A is a diagram 600 illustrating a spectral power of a slice 610 calculated for a rotation angle of −0.006 radians with zero pixels dropped. A DFT of the slice 610 is calculated from a start point 620A to an end point 630. The diagram 600 includes a spectral power chart 615 that illustrates the spectral power of the calculated DFT as a function of frequency. Spectral component 640A has the strongest spectral power.

Figure 6B:
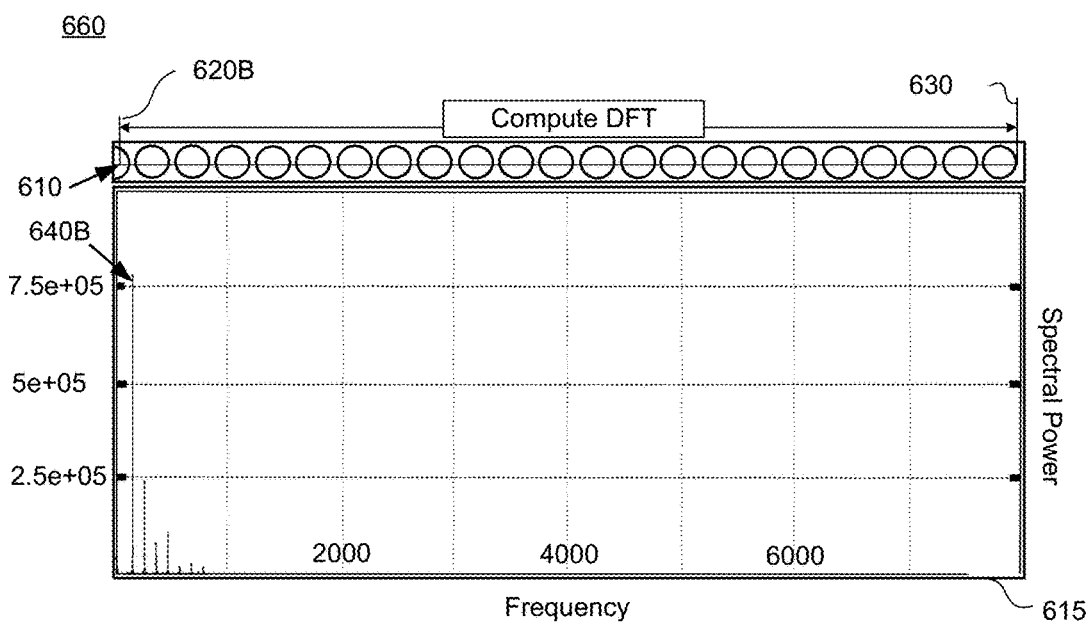
FIG. 6B is a diagram illustrating a spectral power of the slice in FIG. 6A with 'x' pixels dropped, according to an embodiment.

FIG. 6B is a diagram 660 illustrating a spectral power of the slice 610 of FIG. 6A with 'x' pixels dropped. This DFT of the slice 610 is calculated from a start point 620B to the end point 630. The difference between the start point 620A and the start point 620B are 'x' pixels have been dropped from the slice 610. The spectral component 640B, has a higher spectral component than 640A.

Figure 6C:
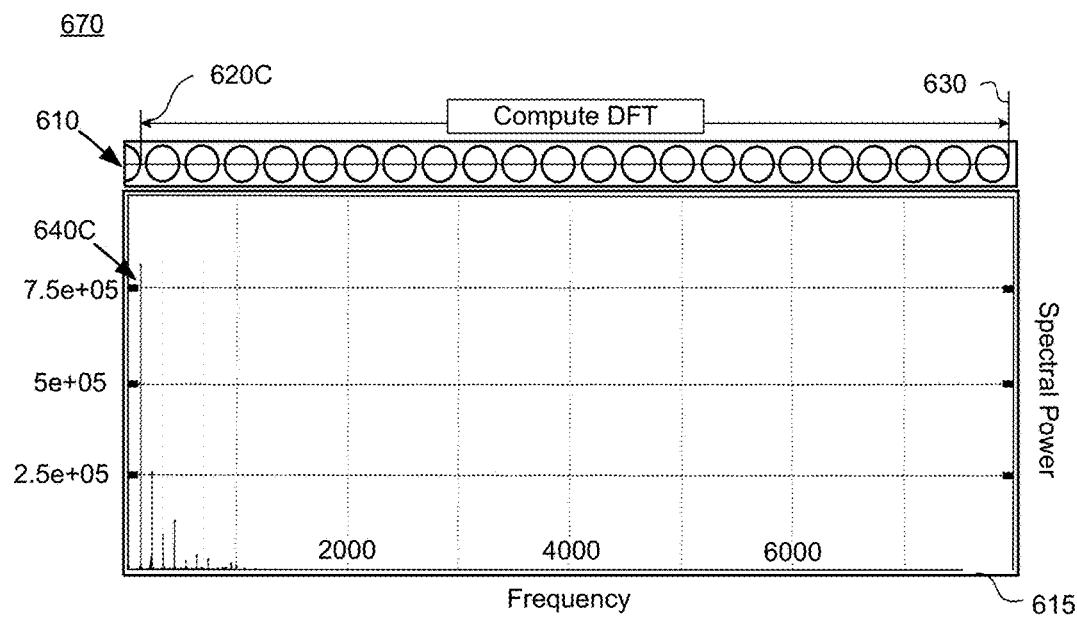
FIG. 6C is a diagram illustrating a maximum spectral power for the slice in FIG. 6A with 'n' pixels dropped, according to an embodiment.

FIG. 6C is a diagram 670 illustrating a maximum spectral power for the slice 610 of FIG. 6A with 'n' pixels dropped. The DFT of the slice 610 is calculated from a start point 620C to the end point 630. The difference between the start point 610A and the start point 610C are 'n' pixels which have been dropped from the slice 610, and 'n' is greater than 'x.' Note, that the spectral component 640C has a higher spectral component than 640A and 640B in FIGS. 6A and 6B.

Figure 6D:
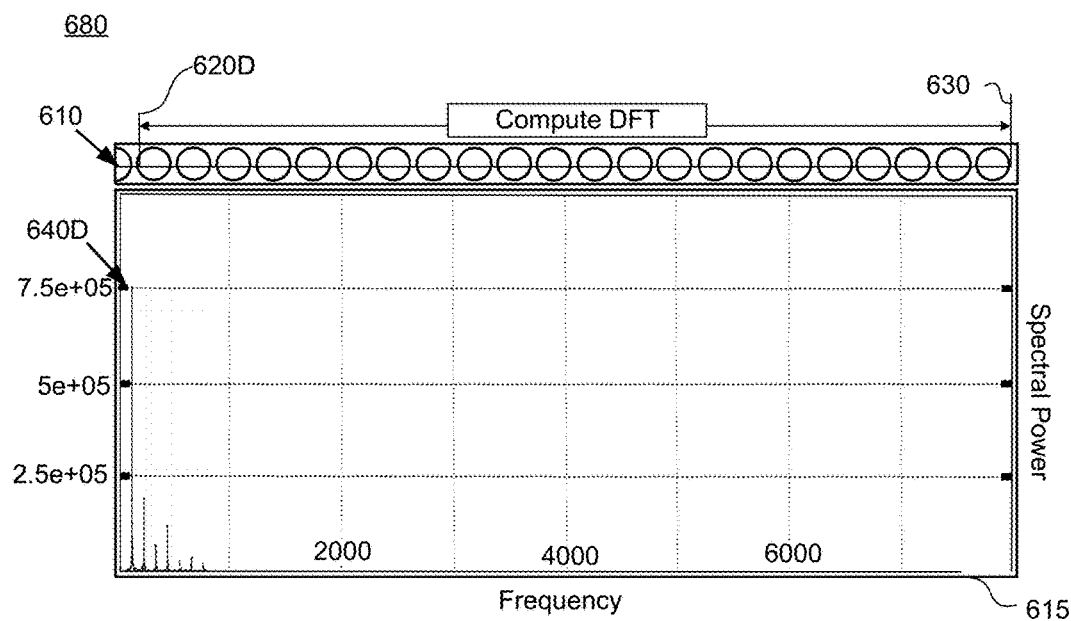
FIG. 6D is a diagram illustrating a spectral power for the slice in FIG. 6A with more than 'n' pixels dropped, according to an embodiment.

FIG. 6D is a diagram 680 illustrating a spectral power for the slice 610 of FIG. 6A with more than 'n' pixels dropped. The DFT of the slice 610 is calculated from a start point 620D to the end point 630. The difference between the start point 620A and the start point 620D is more than 'n' pixels. Note, that the spectral component 640D has a lower spectral component than 640C in FIG. 6C. Accordingly, in this example, spectral component 640C corresponds to the fundamental frequency.

Figure 7A:
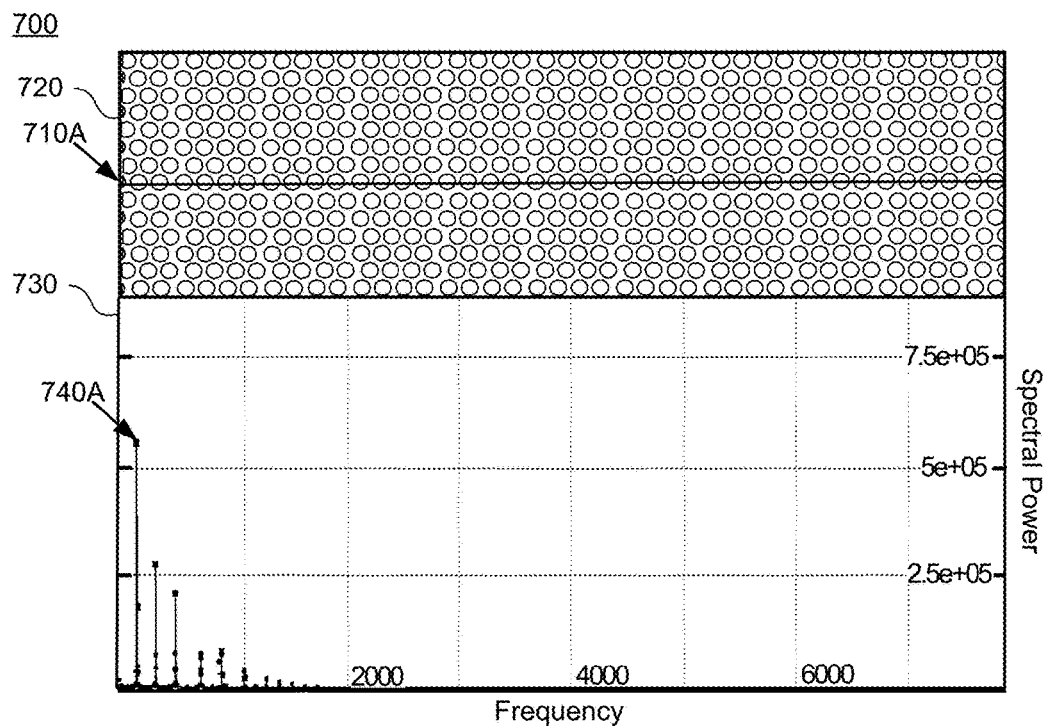
FIG. 7A is a diagram illustrating a spectral power of a slice of a portion of the plenoptic reference image calculated at a rotation angle of −0.004 radians, according to an embodiment.

FIGS. 7A-E illustrate how the spectral power of a slice varies with rotation angle. FIG. 7A is a diagram 700 illustrating a spectral power of a slice 710A of a portion 720 of the plenoptic reference image calculated at a rotation angle of −0.004 radians. The diagram 700 includes the portion 720 of the plenoptic reference image and a spectral power chart 730. The portion 720 is rotated with respect to the slice 710A by a rotation angle of −0.004 radians, and the size of the slice 710A is adjusted for spectral leakage as described previously. The chart 730 illustrates a dominant spectral component 740A at the rotation angle of −0.004 radians.

Figure 7B:
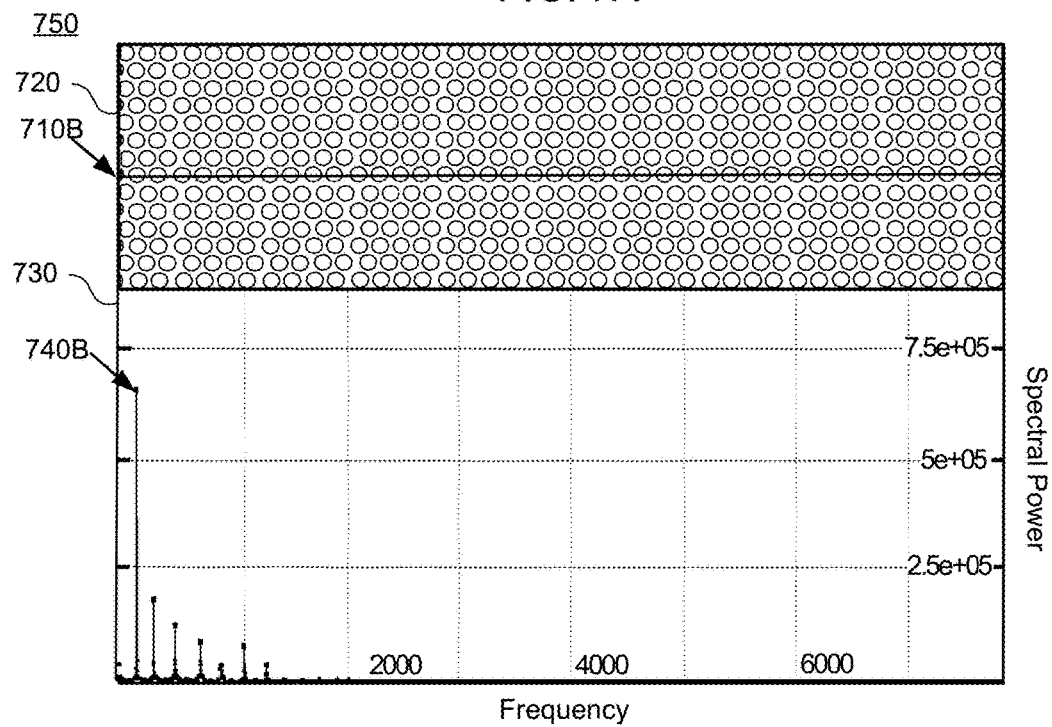
FIG. 7B is a diagram illustrating a spectral power of a slice of the portion of the plenoptic reference image calculated at a rotation angle of −0.005 radians, according to an embodiment.

FIG. 7B is a diagram 750 illustrating a spectral power of a slice 710B of the portion 720 of the plenoptic reference image calculated at a rotation angle of −0.005 radians. The portion 720 is rotated with respect to the slice 710B by a rotation angle of −0.005 radians. The chart 730 illustrates a dominant spectral component 740B at the rotation angle of −0.005 radians. Note, that the dominant spectral component 740B has a higher power than that of 740A in FIG. 7A.

Figure 7C:
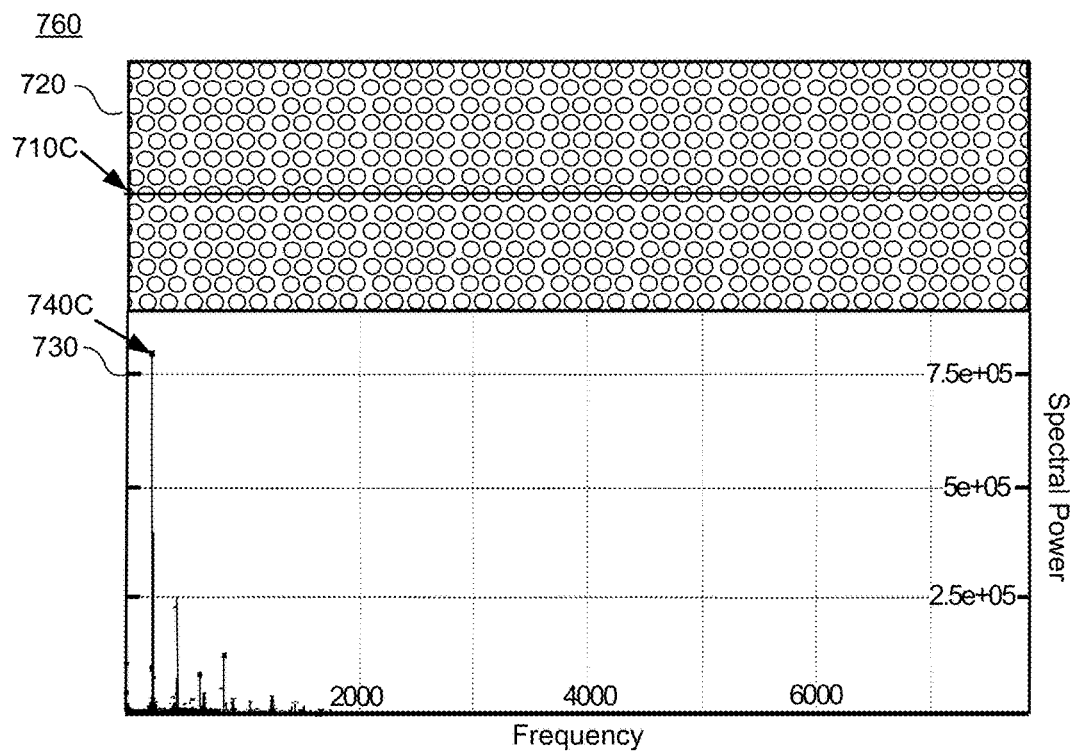
FIG. 7C is a diagram illustrating a spectral power of a slice of the portion of the plenoptic reference image calculated at a rotation angle of −0.006 radian, according to an embodiment.

FIG. 7C is a diagram 760 illustrating a spectral power of a slice 710C of the portion 720 of the plenoptic reference image calculated at a rotation angle of −0.006 radians. The portion 720 is rotated with respect to the slice 710C by a rotation angle of −0.006 radians. The chart 730 illustrates a dominant spectral component 740C at the rotation angle of −0.006 radians. Note, that for this example the rotation angle of −0.006 radians results in the largest dominant spectral component 740C.

Figure 7D:
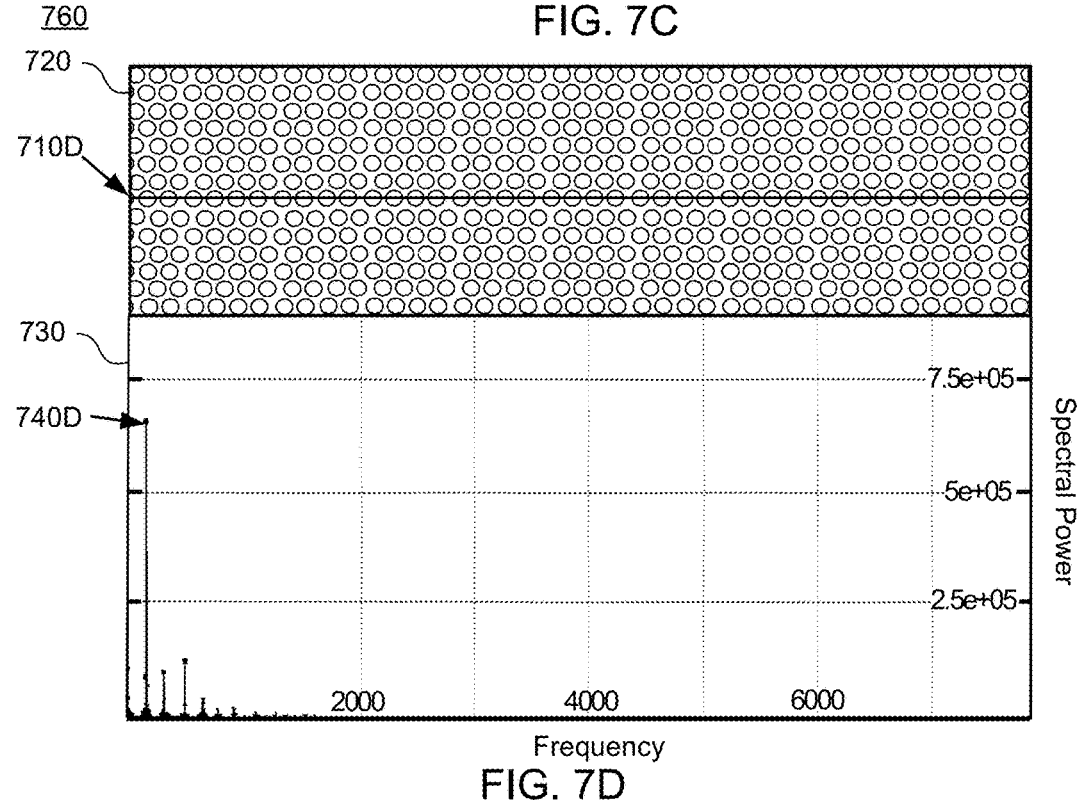
FIG. 7D is a diagram illustrating a spectral power of a slice of the portion of the plenoptic reference image calculated at a rotation angle of −0.007 radians, according to an embodiment.
Figure 7E:
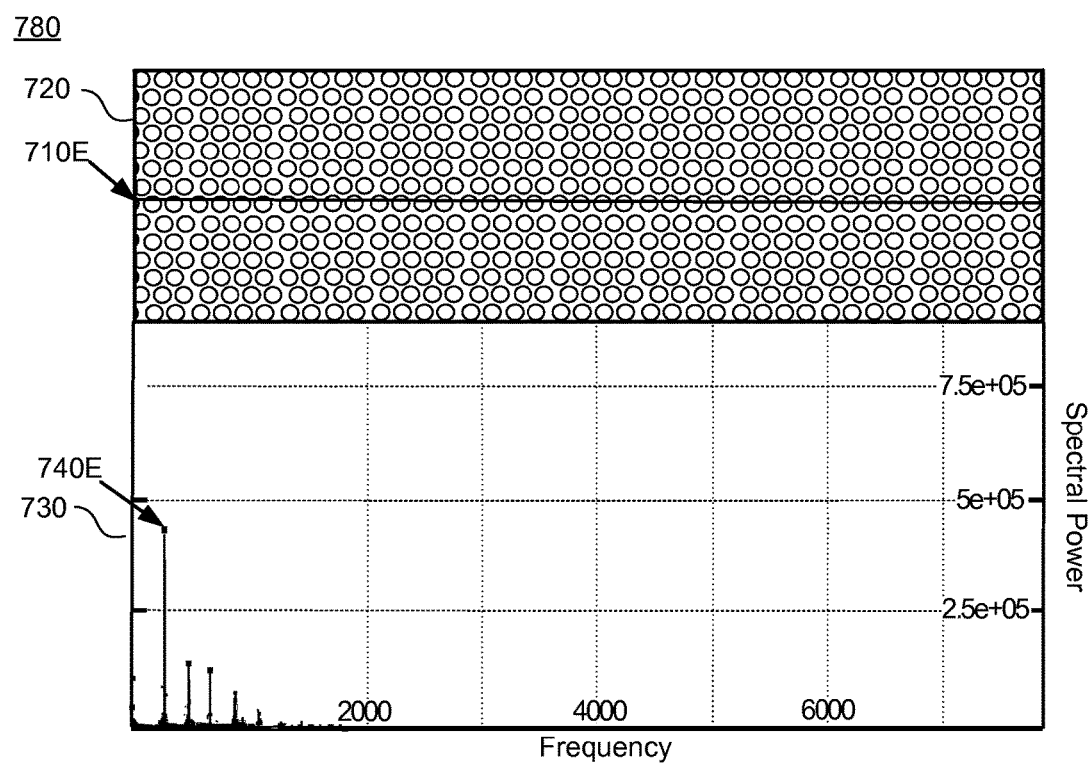
FIG. 7E is a diagram illustrating a spectral power of a slice of the portion of the plenoptic reference image calculated at a rotation angle of −0.008 radians, according to an embodiment.

FIGS. 7D and E illustrate how the power of the dominant component decreases as the rotation angle moves away from −0.006 radians. FIG. 7D is a diagram 770 illustrating a spectral power of a slice 710D of the portion 720 of the plenoptic reference image calculated at a rotation angle of −0.007 radians. The portion 720 is rotated with respect to the slice 710D by a rotation angle of −0.007 radians. The chart 730 illustrates a dominant spectral component 740D at the rotation angle of −0.007 radians. Additionally, FIG. 7E is a diagram 780 illustrating a spectral power of a slice 710E of the portion 720 of the plenoptic reference image calculated at a rotation angle of −0.008 radians. The portion 720 is rotated with respect to the slice 710E by a rotation angle of −0.008 radians. The chart 730 illustrates a dominant spectral component 740E at the rotation angle of −0.008 radians. Note, that the dominant spectral component 740C in FIG. 7C has a higher power than that of 740C, 740D as well as 740A and 740B.

One beneficial effect of the calibration processes discussed above with regard to FIGS. 3 and 4, is that they also account for any variation in effective pitch for a given focal length. For a plenoptic imaging system 100, rotation angle of the plenoptic image relative to the detector array 130 typically does not change with change in focus. However, a change in focus affects the angle of incident light which can affect the pitch determination. In some embodiments, the plenoptic imaging system 100 performs the calibration described above with reference to FIGS. 3 and 4, for different possible focus settings, and accordingly determines a pitch value for different focus settings. For example, focusing on an object at 30 mm may result in a corresponding pitch value of 18.5649 pixels, and focusing on an object at 70 mm may result in a pitch value of 18.5817 pixels. Accordingly, the plenoptic imaging system 100 is able to select the correct pitch value based on a given focus setting.

Figure 8A:
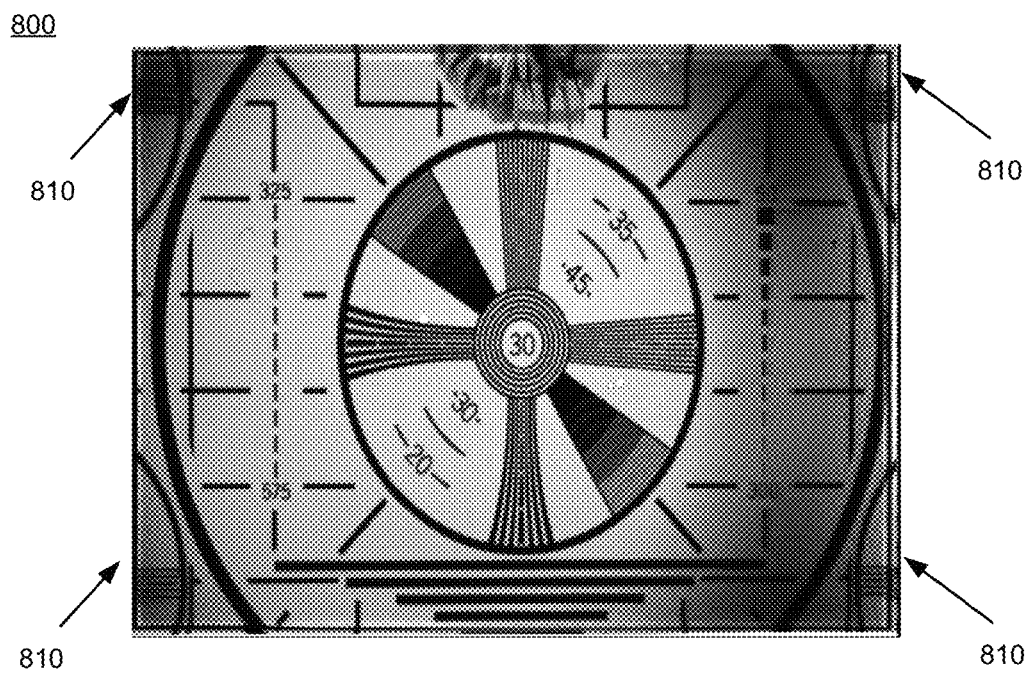
FIG. 8A is an image outputted by the plenoptic imaging system that does not calibrate for a change in pitch due to focus setting, according to an embodiment.
Figure 8B:
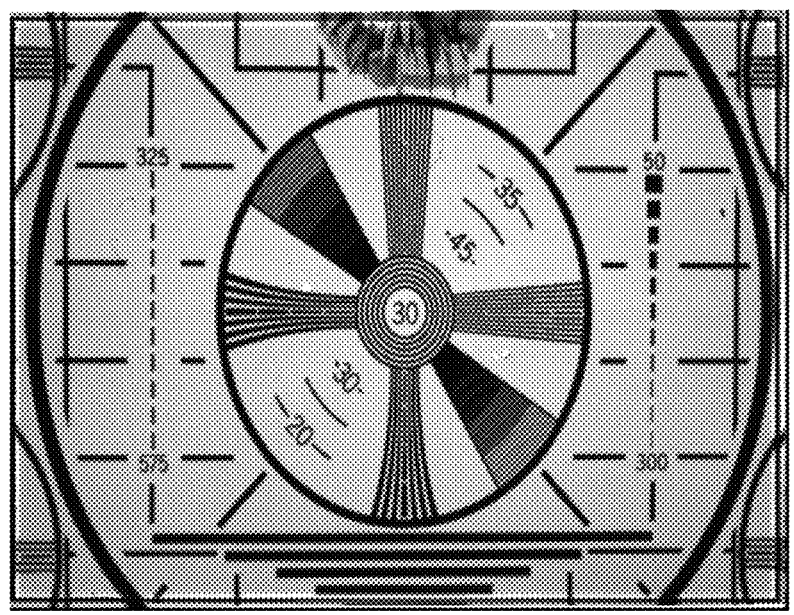
FIG. 8B is an image outputted by the plenoptic imaging system that does calibrate for a change in pitch due to focus setting, according to an embodiment.

If changes in focus are not accounted for it may result in fading around the periphery of the image and/or other distortions to the image. FIG. 8A is an image 800 outputted by the plenoptic imaging system 100 that does not account for a change in pitch caused by focus setting. Note, the fading 810 in the periphery of the image. In contrast, FIG. 8B is an image 850 outputted by the plenoptic imaging system 100 that does calibrate for a change in pitch caused by focus setting.

The calibration of the plenoptic imaging system 100 described above may be performed by different entities and/or at different times. For example, the calibration may be performed at the factory, by a user of the plenoptic imaging system 100 in the field, automatically performed by the plenoptic imaging device 100, etc. For example, the plenoptic imaging system 100 may be configured to perform a calibration when a new image-forming optical module 105 is attached to the plenoptic imaging system 100. In some embodiments calibrating the alignment of the micro-imaging array 120 to the detector array 130 and calibrating the pitch of each microlens 121 in terms of sensor pixel size are both performed systematically (e.g., via processes described above with reference to FIGS. 3 and 4) for every plenoptic imaging system 100. If a multi-spectral filter is added or replaced to a previously calibrated plenoptic imaging system 100, the plenoptic imaging system 100 should be recalibrated. In some embodiments calibrating the pitch parameters due to focus ring settings is performed once for a family of plenoptic imaging systems 100.

The calibration systems and methods disclosed herein have a number of advantages. For example, calibration of the plenoptic imaging system 100 corrects view extraction and aids in super resolution techniques. Additionally, calibration includes alignment of the micro-imaging array 120 with respect to the detector array 130 which corrects view extraction errors by accounting for incorrect views generated by the intermingling of views. Another advantage is that calibrating the pitch of each microlens 121 in terms of sensor pixel size aids in super resolution techniques by taking advantage of sub-pixel data. Additionally, an advantage of calibrating the change in pitch parameters due to focus ring settings is to correct fading around the periphery of the image and/or other distortions to the image by accounting for the impact that change in focus of the lens has on the angle of light being captured.

Additional Configuration Information

Although the detailed description contains many specifics, these should not be construed as limiting the scope of the disclosure but merely as illustrating different examples and aspects of various embodiments. It should be appreciated that the scope of the disclosure includes other embodiments not discussed in detail above.

For example, various types of optical modules can be used, including reflective and catadioptric systems. In some applications, the optical module is preferably telecentric. Finally, terms such as "light" and "optical" are not meant to be limited to the visible or purely optical regions of the electromagnetic spectrum, but are meant to also include regions such as the ultraviolet and infrared (but not be limited to these).

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof. In one embodiment, a software module is implemented with a computer program product comprising a non-transitory computer-readable medium containing computer program code, which can be executed by a computer processor for performing any or all of the steps, operations, or processes described.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

What is claimed is:

1. A method for calibrating a plenoptic imaging system, the plenoptic imaging system including a microlens array and a detector array, the plenoptic imaging system subdividing the detector array into superpixels, the method comprising a processor executing the steps of:
  accessing a plenoptic image captured by the detector array of the plenoptic imaging system;
  for a row of superpixels in the plenoptic image, selecting a one-dimensional slice through the row, the selected slice having a one-dimensional Fourier transform with a stronger fundamental component compared to other one-dimensional slices through the row; and
  determining a pitch of the row of superpixels based on a frequency of the fundamental component of the selected slice, and determining a rotation of the row of superpixels based on a rotation of the plenoptic image relative to the selected slice, wherein the determined pitch is a pitch of the microlens array in terms of pixel size on the detector array and the determined rotation is a rotation of the microlens array relative to the detector array.

2. The method of claim 1, the method further comprising:
  determining a plurality of different rotation angles between the selected slice and the plenoptic image;
  determining a spectral power of the slice at each of the plurality of rotation angles; and
  selecting the rotation angle associated with the highest spectral power, the selected rotation angle being the rotation of the row of superpixels.

3. The method of claim 2, wherein determining a spectral power of the slice at each of the plurality of rotation angles further comprises adjusting each of the spectral powers for spectral leakage.

4. The method of claim 3, wherein adjusting a spectral power for spectral leakage comprises:
  for a particular rotation angle,
    determining a spectral power of the slice for different sample sizes of the slice; and
    selecting the highest spectral power, of the determined spectral powers.

5. The method of claim 1, wherein determining a pitch of the row of superpixels based on a frequency of the fundamental component of the selected slice is done for a plurality of different focus settings.

6. The method of claim 1, wherein the slice spans the entire row of superpixels.

7. The method of claim 1, further comprising:
  sampling the plenoptic image using a plurality of one-dimensional slices, including the selected slice, where each slice is through a different row of superpixels;
  determining the spectral power for each of the slices, and the selected slice is the slice having the highest of the determined spectral powers.

8. A plenoptic imaging system comprising:
  an image-forming optical module characterized by a pupil plane and an image plane;
  an array of micro-imaging elements located at the image plane or a conjugate thereof;
  a detector array located at a conjugate of the pupil plane, wherein the detector array is subdivided into superpixels;
  a processor configured to execute modules;
  a memory storing the modules, the modules comprising a processing module, the processing module configured to:
    access a plenoptic image captured by the detector array of the plenoptic imaging system;
    for a row of superpixels in the plenoptic image, select a one-dimensional slice through the row, the selected slice having a one-dimensional Fourier transform with a stronger fundamental component compared to other one-dimensional slices through the row; and
    determine a pitch of the row of superpixels based on a frequency of the fundamental component of the selected slice, and determine a rotation of the row of superpixels based on a rotation of the plenoptic image relative to the selected slice, wherein the determined pitch is a pitch of the array of micro-imaging elements in terms of pixel size on the detector array and the determined rotation is a rotation of the array of micro-imaging elements relative to the detector array.

9. The system of claim 8, wherein the processing module is further configured to:
- determine a plurality of different rotation angles between the selected slice and the plenoptic image;
- determine a spectral power of the slice at each of the plurality of rotation angles; and
- select the rotation angle associated with the highest spectral power, the selected rotation angle being the rotation of the row of superpixels.

10. The system of claim 9, wherein the processing module is further configured to:
- adjust each of the determined spectral powers for spectral leakage.

11. The system of claim 10, wherein the processing module is further configured to:
- for a particular rotation angle,
  - determine a spectral power of the slice for different sample sizes of the slice; and
  - select the highest spectral power, of the determined spectral powers.

12. The system of claim 8, wherein the processing module is further configured to:
- determine a pitch of the row of superpixels based on a frequency of the fundamental component of the selected slice for a plurality of different focus settings.

13. The system of claim 8, wherein the slice spans the entire row of superpixels.

14. The system of claim 8, wherein the processing module is further configured to:
- sample the plenoptic image using a plurality of one-dimensional slices, including the selected slice, where each slice is through a different row of superpixels;
- determine the spectral power for each of the slices, and the selected slice is the slice having the highest of the determined spectral powers.

15. A non-transitory computer-readable storage medium storing executable computer program instructions for calibrating a plenoptic imaging system that includes a microlens array and a detector array, the plenoptic imaging system subdividing the detector array into superpixels, the instructions executable by the plenoptic imaging system to perform steps comprising:
- accessing a plenoptic image captured by the detector array of the plenoptic imaging system;
- for a row of superpixels in the plenoptic image, selecting a one-dimensional slice through the row, the selected slice having a one-dimensional Fourier transform with a stronger fundamental component compared to other one-dimensional slices through the row; and
- determining a pitch of the row of superpixels based on a frequency of the fundamental component of the selected slice, and determining a rotation of the row of superpixels based on a rotation of the plenoptic image relative to the selected slice, wherein the determined pitch is a pitch of the microlens array in terms of pixel size on the detector array and the determined rotation is a rotation of the microlens array relative to the detector array.

16. The computer-readable storage medium of claim 15, further comprising:
- determining a plurality of different rotation angles between the selected slice and the plenoptic image;
- determining a spectral power of the slice at each of the plurality of rotation angles; and
- selecting the rotation angle associated with the highest spectral power, the selected rotation angle being the rotation of the row of superpixels.

17. The computer-readable storage medium of claim 16, wherein determining a spectral power of the slice at each of the plurality of rotation angles further comprises adjusting each of the spectral powers for spectral leakage.

18. The computer-readable storage medium of claim 17, wherein adjusting a spectral power for spectral leakage comprises:
- for a particular rotation angle,
  - determining a spectral power of the slice for different sample sizes of the slice; and
  - selecting the highest spectral power, of the determined spectral powers.

19. The computer-readable storage medium of claim 15, wherein determining a pitch of the row of superpixels based on a frequency of the fundamental component of the selected slice is done for a plurality of different focus settings.

20. The computer-readable storage medium of claim 15, further comprising:
- sampling the plenoptic image using a plurality of one-dimensional slices, including the selected slice, where each slice is through a different row of superpixels;
- determining the spectral power for each of the slices, and the selected slice is the slice having the highest of the determined spectral powers.

* * * * *